United States Patent Office 3,578,565
Patented May 11, 1971

3,578,565
PROCESS FOR THE MANUFACTURE OF STEROIDS OF THE ANDROSTANE SERIES
Arno Johannes Schocher, Benken, Andor Furst, Basel, Hans Els, Binningen, and Elisabeth Becher and Gisela Gross, Basel, Switzerland, assignors to Hoffmann-La Roche Inc., Nutley, N.J.
No Drawing. Filed Oct. 1, 1968, Ser. No. 766,021
Claims priority, application Switzerland, Oct. 5, 1967, 13,930/67
Int. Cl. C07c *167/18*
U.S. Cl. 195—51                                17 Claims

ABSTRACT OF THE DISCLOSURE

Microbiological process for preparing 17-oxygenated androstanes by subjecting 20-oxygenated pregnanes to the action of a culture of the fungus *Gliocladium roseum*. The steroids prepared are known compounds which are pharmaceutically useful as androgenic agents and as intermediates which can be converted to known compounds which are progestational agents.

BACKGROUND OF THE INVENTION

When employing known processes for the degradation of the C–17 side chain of steroids of the pregnane series, undesired by-products such as lactones (e.g. testololactone) are often formed in addition to the desired 17-oxygenated androstanes. The instant invention provides a method for preparing 17-oxygenated androstanes which avoid the above-mentioned prior art objections.

DETAILED DESCRIPTION OF THE INVENTION

This invention relates to a novel process for the preparation of cyclopentanopolyhydrophenanthrene derivatives. More particularly, the present invention is concerned with a microbiological process for the manufacture of C–17 oxygenated steroids of the androstane series. The process is characterized in that a C–20-oxygenated steroid of the pregnane series is subjected to aerobic enzymatic oxidation by means of a culture of the fungus *Gliocladium roseum* in accordance with the following reaction scheme:

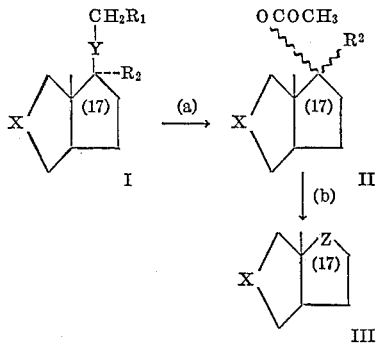

wherein Y is carbonyl or >CHOH; $R_1$ and $R_2$ are independently hydrogen, hydroxy or acyloxy; Z is carbonyl or CHOC; and X represents the A, B and C rings of a steroid molecule which may be substituted as hereinafter described.

In a further aspect, the invention relates to a method for controlling the relative amounts of reaction products of the pregnane degradation, viz. the acetate of Formula II and the ketone or hydroxy derivative of Formula III.

As used throughout the application, the term "acyl" comprehends a group derived from an acid residue formed by removal of the hydroxyl portion of the carboxyl group from (1) an aliphatic branched or straight chain, optionally substituted by functional groups such as hydroxy and alkoxy containing up to 5 carbons, alkanoic or alkenoic carboxylic acid with up to 20 carbon atoms, such as, for example, formic, acetic, propionic, butyric, stearic, palmitic, 3-butenoic, succinic, malonic, citric, and the like, (2) a carbocyclic carboxylic acid containing up to 20 carbon atoms, such as, for example, cyclopentane carboxylic acid, or (3) an aromatic or araliphatic carboxylic acid containing up to 20 carbon atoms, such as, for example, benzoic acid.

The pregnane starting material of the Formula I above can contain one or more double bonds. Particularly suitable pregnanes are those which are unsaturated at C–4, C–5 or C–4,6. The starting materials can contain in addition to the substituents indicated at C–17 one or more additional substituents in the ring system of the steroid nucleus which will not interfere with the reaction. Examples of such substituents are hydroxy groups, especially at positions C–3, C–9, C–11, C–15 and C–16 and a 3-oxo group. A protected hydroxy group is, for example, an esterified hydroxy group (esterified, for example, with a group, such as $R_1$ or $R_2$ defined as aforesaid). Starting steroids which can also be employed are steroids having a "retro" configuration, i.e. steroids in which the group at C–10 has an α-configuration and the substituent group at C–9 has a β-configuration. The retro-steroids employed by the instant process are known in the art. (See, for example Belgian Pat. 577,615 and U.S. Pat. 3,198,792.)

The process of the present invention involves the incubation of a fungus culture of *Gliocladium roseum*, particularly *Gliocladium roseum* Bainier and especially the strains of the species registered under American Type Culture Collection ATCC 20010 and strains registered under Swiss Federal Institute of Technology ETH 4511, ETH 4512, ETH 4513 and ETH 4517. The species *Gliocladium roseum* Bainier described herein includes all strains of this fungus which are operable to effect the subject degradation reaction and which cannot be definitely differentiated from the above indicated strains and its subcultures including mutants and variants.

As the nutrient medium employed for the incubation of the *Gliocladium roseum* Bainier there can be used solutions which are known in the art for the production of this microorganism. For example, nutrient solutions which contain a nitrogen and carbon source as well as a source of inorganic salts can be employed. The culture medium can contain as a source of nitrogen, animal, vegetable, microbial and inorganic nitrogen compounds such as, for example, meat extracts, peptones, cornsteep, yeast extract, glycine and sodium nitrate and the like. The source of carbon may be a carbohydrate such as, for example, starch, dextrin, saccharose, maltose and glucose. The inorganic salt may be a halide, phosphate, sulfate or nitrate of an alkaline or alkaline earth metal, for example, sodium chloride, potassium chloride, potassium sulfate, sodium nitrate, manganese sulfate or any other salt known to those skilled in the art which is used in microbiological cultures. It it is desired, there may be employed combinations of more than one source of nitrogen and/or carbon and more than one salt. A particular suitable nutrient media for the *Gliocladium roseum* Bainier microorganism are those which contain cornsteep liquor, soya meal, yeast extract, peptone, malt extract, meat or fish meal, protein hydrolysate, corn or wheat-gluten as the main ingredients and exhibit a pH value below 8, preferably at a pH range of 5.0–6.3. Exemplary of suitable culture media are the following:

(1) 5% glucose, 2% peptone, 0.5% cornsteep; tap water, pH 6.2.
(2) 0.027% $MgCO_3$, 0.26% D-tartaric acid, 0.26% ammonium tartrate, 0.017% ammonium sulfate, 0.04% sec. ammonium phosphate, 0.04% $K_2CO_3$, 2.0% peptone, 5.0% glucose, 0.1% yeast extract, 0.1 ml. trace element solution (1 g. $FeSO_4 \cdot 7H_2O$, 0.15 g. $CuSO_4 \cdot 5H_2O$, 1 g. $ZnSO_4 \cdot 7H_2O$, 0.1 g. $MnSO_4 \cdot 4H_2O$ and 0.1 g. $K_2MoO_4$ in 1 liter of tap water); tap water, pH 5.0.

(3) 1.5% peptone, 0.3% cornsteep, 0.005% glucose; tap water, pH 6.5.

(4) 0.25% NaCl, 0.4% peptone, 1.0% glucose, 0.4% meat extract, 0.1% yeast extract; dist. water, pH 6.3.

(5) 1% glucose, technical, 1% soya meal, 2% cornsteep, 0.5% NaCl, 0.1% $NaNO_3$, 1.0% $CaCO_3$; dist. water, pH 7.8.

(6) 1% glucose, technical, 1% soya meal, 0.5% NaCl, 0.1% $NaNO_3$, dist. water, pH 7.5–8.

(7) 3.5% glucose, technical, 0.1% yeast extract, 0.1% glutamic acid, 0.1% $NH_4NO_3$, 0.05% cornsteep, 0.15% $KH_2PO_4$, 0.15% $MgSO_4 \cdot 7\ H_2O$, 0.05% aneurin.

(8) 2% glucose, 0.5% yeast extract, 0.1% $K_2HPO_4$, 0.05% $MgSO_4 \cdot 7H_2O$, 0.05% KCl, 0.001% $ZnSO_4 \cdot 7H_2O$, 0.001% $FeSO_3 \cdot 7H_2O$; tap water.

(9) 2% malt extract, 2% glucose, 0.025%

$$MgSO_4 \cdot 7H_2O$$

0.05% $KH_2PO_4$; dist. water, pH 6.8.

(10) 2% meat meal, protein hydrolystate, corn- or wheat-gluten, 1% glucose, 0.2% $KH_2PO_4$, 0.1% NaCl.

Beneficial results are obtained if an inducer-steroid is added to the culture medium. The inducer is conveniently added to the culture after the development of visible growth, viz. at a culture age between 15 and 40 hours. Suitable enzyme inducers are for example: $9\beta,10\alpha$-pregn-4-ene-3,20-dione; $17\beta$-acetoxy-$9\beta,10\alpha$-androst-4-en-3-one; $9\beta,10\alpha$-testosterone; $9\beta,10\alpha$-androst-4-ene-3,17-dione; $9\beta,10\alpha$-pregna-4,6-diene-3,20-dione; $17\alpha$-hydroxy-$9\beta,10\alpha$-pregn-4-ene-3,20-dione; 21-hydroxy-$9\beta,10\alpha$-pregn-4-ene-3,20-dione; $17\alpha,21$-dihydroxy-$9\beta,10\alpha$-pregn-4-ene-3,20-dione.

Inoculation of the fungal growth-supporting medium with the selected fungus strain of the species *Gliocladium roseum* Bainier may be accomplished in any suitable manner.

The period of fungal growth required before the pregnane starting reactant is exposed to the oxygenating activity of the fungus does not appear to be critical. However, superior results have been obtained by providing a pregrowth of the culture from about 15 to 96 hours. Thus, the preferred process is as follows: After sterilization of the culture media (at approximately 120° C. for about 15 minutes) the nutrient solution is inoculated with a suspension of *Gliocladium roseum* Bainier and thereafter shaken or stirred under aerobic conditions for about 15 to 96 hours in such a way that maximal surface contact between the steroid and microorganism is achieved.

The addition of the steroid substrate to be oxygenated may be accomplished in any suitable manner so as to promote intimate contact of the steroid substrate with the oxygenating activity of the fungus and/or fungal enzymes. Preferably, the steroid is distributed by means of a dispersing agent or is brought into the medium solution in an organic solvent, such as, for example, acetone, propylene glycol, dimethylsulfoxide and a lower alcohol, such as methanol, ethanol, isopropyl alcohol and the like.

While any form of aerobic incubation is satisfactory for the growth of the selected fungus or the bio-oxygenation of the steroid substrate, the efficiency of the oxygenation is related to aeration. Therefore, controlled aeration as by agitation and/or blowing air through the fermentation media is usually employed.

The time required for the bio-oxygenation of the steroid varies according to the results desired, although periods of from about 4 hours to 48 hours after the addition of the steroid give satisfactory yields.

The temperature employed during the period of bio-oxygenation of the steroid and pregrowth of the culture need be maintained only within such ranges as to support life, active growth or the oxygenating activity of the fungal organism. A preferred temperature range is from about 20° C. to 40° C., especially between 25° C. and 35° C.

In accordance with this invention, the $C_{20}$-oxygenated pregnanes of Formula I are converted sequentially to the androstanes of Formulas II and III. Thus, the acetates of the general Formula II are obtained as the first metabolite and the $C_{17}$ ketones and alcohols of the general Formula III are obtained as the second metabolite. As soon as the first metabolite (acetate) is formed in a sufficient concentration, it is quickly converted into the second metabolite by saponification, and it is therefore difficult to obtain a maximal amount of one or the other metabolite. However, it has now surprisingly been found that the reaction can be controlled through the type and amount of organic solvent employed with the steroid starting material. Thus, in this aspect of the process, it is possible to control the reaction so that: (a) the formation of the first metabolite (acetate) proceeds slowly and (b) the saponification of the first metabolite is largely prevented thereby yielding the first metabolite in maximal amounts as desired. However, when $R_2$ in Formula I represents hydroxy or acyloxy the first metabolite is generally so unstable that it is very quickly converted to the second metabolite and cannot usually be isolated. Alternatively, when maximal yields of the second metabolites are desired, either the addition of the steroid starting material to the medium will be made without previous solution in an organic solvent or the reaction time can be extended so as to effect complete conversion of the first metabolite into the second metabolite.

The course of the fermentation can be controlled by removal of samples and performing thin-layer chromatographical analysis thereon. Suitable for this purpose is, for example, chromatography on silica gel G-fluorescence thin-layer plates with ether-dichloromethane (9:1) as the developing liquid. Analysis of the fermentation reaction by thin-layer chromatography reveals the dependence of the concentration of the first metabolite (acetate) of Formula II on the type and amount of the organic steroid solvent employed. This finding is demonstrated in the table which follows. The data was obtained using as an example the fermentation of r-testosterone acetate from r-progesterone. The experimental conditions employed to establish the data in the following table are as follows: 2 grams of r-progesterone dissolved in definite amounts of ethanol, methanol, propanol or dimethylsulfoxide are added to a fermentation vat containing 8 liters of fermentation solution. Samples are removed at certain time intervals and the formed r-testosterone-acetate is semi-quantitatively determined, i.e. by measuring the absorption of the spots of the thin-layer chromatogram at 254 m$\mu$ and comparing with a series of reference spots of known r-testosterone-acetate concentration.

| r-Progesterone | Ml. | Maximal fermentation of r-testosterone acetate in the fermentation solution | | |
|---|---|---|---|---|
| | | In percent of r-P [1] used | Reached after addition of r-P [1] in hours | Maintaining the maximal level of r-Tac,[2] in hours |
| Solvent: | | | | |
| Acetone | 80 | 60 | 7 | ca. 1 |
| | 80 | 70 | 7 | ca. 1 |
| | 160 | 80 | 8 | ca. 7 |
| Ethanol | 240 | 100 | 15 | ca. 27 |
| | 320 | 80–90 | 40 | ca. 80 |
| | 400 | 65–80 | 48 | ca. 168 |
| | 80 | 90 | 8 | ca. 1 |
| | 160 | 100 | 7 | ca. 1 |
| Methanol | 240 | 90 | 8 | ca. 1 |
| | 320 | 80 | 10 | ca. 4 |
| | 400 | 70 | 7 | ca. 7 |
| | 480 | 60 | 18 | ca. 40 |
| Propanol | 80 | 90 | 13 | ca. 30 |
| Dimethylsulfoxide | 80 | 90 | 13 | ca. 4 |

[1] r-Progesterone. [2] r-Testosterone acetate.

After completion of the oxygenating fermentation reaction the fermented steroids of Formulas II and III are isolated from the reaction mixture. The isolation of the steroid is carried out by the usual methods such as extraction from the incubation medium using an organic solvent immiscible with water, for example, a halogenated hydrocarbon, such as a methylene chloride, chloroform, carbon tetrachloride, trichloroethylene, and the like; aromatic homocyclic solvents, e.g., benzene, toluene, xylene, and the like; and lower alcohols, such as methanol, ethanol, and the like. The extraction step is followed by evaporation of the extract, the final product being purified by known methods, the most common ones being chromatography, crystallization or by means of countercurrent distribution. The metabolites of Formulas II and III can also be recovered from the fermentation broth by employing water-miscible solvents, such as dimethylsulfoxide and acetone.

The specific products of the subject process, viz. the androstanes of Formulas II and III, which are produced depend on the particular substituents and unsaturation on the A, B and C rings of the starting pregnane steroid nucleus, which is defined by the variable X. Exemplary of the pharmaceutically active compounds of the Formula II which may be prepared from the corresponding pregnanes in accordance with this invention is 17β-acetoxy-androsta-4,6-diene-3β-ol, an androgenic agent claimed in U.S. Patent 3,013,028. Exemplary of the pharmaceutically active compounds of the Formula III which may be prepared from the corresponding pregnanes in accordance with this invention is testosterone, a natural androgenic hormone.

The 17-keto androstanes of Formula III may be selectively ethynalated at C–17 by known means, viz. by a suitable organic metallic acetylide such as lithium acetylide in the presence of liquid ammonia in a solvent such as benzene or toluene. 17-ethinyl steroids are a known class of pharmaceutically valuable progestational steroids, cf. U.S. Patents 3,032,563 and 3,064,014. The conversion of 20-ketosteroids to 17-oxygenated androstanes has been the subject of much investigation by those skilled in the art. See Carl Djerassi, Steroid Reactions (1963), Holden-Day, Inc.

The following examples are illustrative but not limitative of the inventions. The temperatures are stated in degrees centigrade.

EXAMPLE 1

A culture *Gliocadium roseum* Bainier, ATCC 20010 obtained from one half of the surface of an eight-day old agar slant is added to 5 ml. of distilled water. This solution is then added to 100 ml. of a nutrient mixture containing 0.027% magnesium carbonate, 0.26% D-tartaric acid, 0.26% ammonium tartrate, 0.017% ammonium sulfate, 0.04% sec. ammonium phosphate, 0.04% potassium carbonate, 2% peptone, 5% glucose, 0.1% yeast extract, 0.001% of a trace element solution comprising (1 g. $FeSO_4 \cdot 7H_2O$; 0.15 g. $CuSO_4 \cdot 5H_2O$; 1 g. $ZnSO_4 \cdot 7H_2O$; 0.1 g. $MnSO_4 \cdot 4H_2O$; 0.1 g. $K_2MoO_4$ in 1 liter of tap water).

The inoculated nutrient solution is agitated at 28° C. for approximately 37 hours in a baffled 500 ml. Erlenmeyer flask sealed with a cotton-wool stopper. The mixture is then added to a small fermenter charged with 7 liters of the same nutrient solution as described above and 10–20 ml. of vegetable oil. The mixture is incubated at 28° C. for 31 hours while aerating with 6–8 liters of air per minute. One liter of the thus obtained inoculated nutrient solution is then added to a large fermenter and an additional 90 liters of the same nutrient solution described above was added. The fermentation mixture is mechanically shaken and continually aerated (40 liters/min.) for 24 hours. To this fermentation mixture is added 22.5 g. of 9β,10α-pregn-n-4-ene-3,20-dione dissolved in 1600 ml. of dimethylsulfoxide. The fermentation preceded for a length of 5 hours.

The fermentation broth is then separated from the mycelium by filtration and extracted twice in a countercurrent extractor using a methylene chloride solvent at a ratio of 2:1 (solvent to fermentation broth). The separated mycelia is triturated with acetone and thereafter exhaustively extracted with chloroform. The extract obtained from the fermentation broth and mycelium were evaporated affording an oily crude extract. In order to remove the dimethylsulfoxide, the crude extract was evaporated twice with dimethylformamide and once with benzene. The thus obtained residue was dissolved in acetone, purified using carbon and the solvent is then evaporated. The residue chromatographed on silica gel (granule size 0.05–0.2 mm.) with benzene-acetone. Fractions were collected in aliquots of 30 ml. Fraction numbers 1 to 250 were eluted with benzene-acetone (19:1) and subsequent fractions with benzene-acetone (4:1) yielding a mixture containing 20% 17β-acetoxy-9β,10α-androst-4-en-3-one and 27.5% 9β,10α-testosterone (based upon starting reactant).

EXAMPLE 2

The fermentation was carried out as described in Example 1 except that the small fermenter was inoculated with a 24-hour culture. The fermentation was terminated after 5 hours yielding a mixture containing 18% of 17β-acetoxy-9β,10α-androst-4-en-3-one and 20.8% of 9β,10β-testosterone (based on starting pregnene reactant).

EXAMPLE 3

The fermentation was carried out as described using the methods described in Example 2 above with the exception that the time for fermentation was extended from 5 hours to 24 hours. The products obtained are a mixture comprising 39% of 17β-acetoxy-9β,10α-androst-4-en-3-one, 29.5% of 9β,10α-testosterone and 8.3% of 9β,10α-androst-4-ene-3,17-dione.

EXAMPLE 4

The method of Example 1 was repeated in all its details except one; that is, substituting for the starting materials listed therein the materials hereinafter listed in Column I, thus yielding the corresponding steroids set forth in Column II.

| Column I | Column II |
| --- | --- |
| Pregn-5-en-3-ol-20-one | Testosterone. Androst-4-ene-3,17-dione. |
| 11α-hydroxy-9β,10α-pregn-4-en-3,20-dione. | 11α-hydroxy-17β-acetoxy-9β,10α, androst-4-en-3-one. |
| 15α-hydroxy-9β,10α-pregn-4-en-3,20-dione. | 15α-hydroxy-17β-acetoxy-9β,10α-androst-4-en-3-one. 15α,17β-dihydroxy-9β,10α-androst-4-en-3-one. |
| Progesterone | Testosterone acetate. Testosterone. |
| 11α-hydroxy-progesterone | 11α-hydroxy-testosterone. |
| 15α-hydroxy-progesterone | 15α-hydroxy-testosterone. |
| 16α-hydroxy-9β,10α-pregn-4-en-3,20-dione. | 16α-hydroxy-17β-acetoxy-9β,10α-androst-4-en-3-one. 16α,17β-dihydroxy-9β,10α-androst-4-en-3-one. |
| 16α-hydroxy-9β,10α-pregna-4,6-diene-3,20-dione. | 16α-hydroxy-17β-acetoxy-9β,10α-androsta-4,6-dien-3-one. 16α,17β-dihydroxy-9β,10α-androsta-4,6-dien-3-one. |

EXAMPLE 5

The method of Example 1 was repeated in all its details except as follows: 2 g. of r-progesterone is dissolved in 240 ml. of absolute ethanol and added to a 24-hour culture in 8 liters of nutrient solution in the small fermenter. After 6 hours, the yield is 86% r-testosterone acetate and 14% r-testosterone (based upon starting r-progesterone).

EXAMPLE 6

The method of Example 5 was repeated in all its details except that 2 g. of Δ⁶-r-progesterone is dissolved in 300 ml. of absolute ethanol and used as the starting material. After 26 hours, the yield is 21.1% of Δ⁶-r-testosterone acetate and 37.8% Δ⁶-r-testosterone (based upon the starting material).

We claim:
1. The process for the preparation of C–17 acetoxy and hydroxy steroids of the androstane series which comprises subjecting a pregnane of the formula

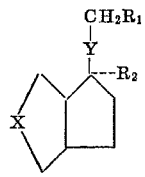

wherein Y is carbonyl or >CHOH; $R_1$ and $R_2$ are independently hydrogen, hydroxy or acyloxy and X represents the A, B and C rings of a steroid nucleus to an oxygenating strain of the microorganism *Gliocladium roseum* Bainier including its enzymes, mutants and variants in a fermentation medium under aerobic conditions at a temperature sufficient to support the oxygenating activity of the organism and then isolating said C–17 acetoxy and hydroxy steroids from the fermentation mixture.

2. The process of claim 1 wherein the *Gliocladium roseum* Bainier is strain ATCC 20010.

3. The process of claim 1 wherein the oxygenation fermentation is carried out at a temperature of from about 20° C. to 40° C.

4. The process of claim 1 in which the oxygenation fermentation is carried out at a temperature of from about 25° C. to 35° C.

5. The process of claim 1 wherein the starting material is selected from the group consisting of $\Delta^4$-steroids, $\Delta^{4,6}$-steroids and $\Delta^5$-steroids.

6. The process of claim 1 wherein the starting material is selected from steroids substituted at one or more of the positions C–9, C–11, C–15 and C–16 with hydroxy and/or at C–3 position with hydroxy or oxo.

7. The process of claim 1 where in the starting steroid has a 9β-10α-retro configuration.

8. The process of claim 1 wherein $R_1$ is hydrogen, Y is selected from the group consisting of carbonyl and CHOH and $R_2$ is hydrogen.

9. The process as in claim 1 wherein $R_2$ is acyloxy selected from the group consisting of acid residue formed by removal of the hydroxyl portion of a carboxyl group from an aromatic or araliphatic carboxylic acid containing up to 20 carbon atoms and from an alkanoic or alkenoic carboxylic acid containing up to 20 carbon atoms; $R_1$ is hydrogen and Y is selected from the group consisting of carbonyl and >CHOH.

10. The process of claim 1 wherein the starting compound is 9β,10α-pregn-4-ene-3,20-dione.

11. The process of claim 1 wherein the starting reactant is progesterone.

12. The process of claim 1 wherein the starting material is pregn-5-en-3-ol-20-one.

13. The process of claim 1 wherein the starting steroid material is dissolved in an organic solvent prior to contact with the microorganism.

14. The process of claim 13 wherein the organic solvent is selected from the group consisting of lower alcohol, acetone and dimethylsulfoxide.

15. The process of claim 1 wherein the starting steroid is dissolved in an organic solvent and the fermentation is terminated when an optimal concentration of C–17 acetoxy steroid of the androstane series has been reached.

16. The process of claim 1 wherein the androstane produced is of the formula

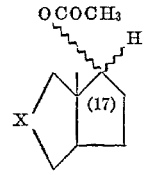

wherein X is the A, B and C rings of the steroid nucleus.

17. The process of claim 1 wherein the androstane produced is of the formula

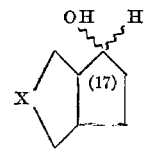

wherein X is the A, B and C rings of the steroid nucleus.

References Cited

UNITED STATES PATENTS 2,721,828    10/1955    Murray et al. __ 195—51(A417)
3,395,079    7/1968    Flines et al. ___ 195—51(A417)

ALVIN E. TANENHOLTZ, Primary Examiner